(12) United States Patent
Jiang et al.

(10) Patent No.: US 11,620,049 B2
(45) Date of Patent: Apr. 4, 2023

(54) METHOD, ELECTRONIC DEVICE AND COMPUTER PROGRAM PRODUCT FOR MANAGING STORAGE SPACE

(71) Applicant: EMC IP Holding Company LLC, Hopkinton, MA (US)

(72) Inventors: Changxu Jiang, Chengdu (CN); Fei Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/030,815

(22) Filed: Sep. 24, 2020

(65) Prior Publication Data
US 2022/0035528 A1 Feb. 3, 2022

(30) Foreign Application Priority Data
Jul. 31, 2020 (CN) .......................... 202010759557.9

(51) Int. Cl.
*G06F 3/06* (2006.01)
*G06N 20/00* (2019.01)

(52) U.S. Cl.
CPC .......... *G06F 3/0604* (2013.01); *G06F 3/0631* (2013.01); *G06F 3/0679* (2013.01); *G06N 20/00* (2019.01)

(58) Field of Classification Search
CPC .... G06F 3/0604; G06F 3/0631; G06F 3/0679; G06N 20/00
See application file for complete search history.

(56) References Cited

U.S. PATENT DOCUMENTS

| | | | |
|---|---|---|---|
| 9,223,799 B1 | 12/2015 | Veeraswamy et al. | |
| 9,880,743 B1 | 1/2018 | Armangau et al. | |
| 9,881,014 B1 | 1/2018 | Bono et al. | |
| 10,509,667 B1* | 12/2019 | Popuri | G06F 9/45558 |
| 10,789,210 B2 | 9/2020 | Yan et al. | |
| 2011/0082837 A1* | 4/2011 | Cherkasova | G06F 11/3419 |
| | | | 707/654 |

(Continued)

OTHER PUBLICATIONS

Chamness, Mark, Capacity forecasting in a backup storage environment, Dec. 14, 2011, Proceedings of USENIX Large Installation System Administration Conference (LISA), vol. 4 (Year: 2011).*

*Primary Examiner* — Francisco A Grullon
(74) *Attorney, Agent, or Firm* — BainwoodHuang (57) ABSTRACT

Techniques involve: determining, based on sizes of a storage space used by a file system at a set of historical moments and a current moment, predicted sizes of a storage space to be used by the file system at a plurality of future moments. The techniques further involve: determining sizes of an available storage space and available durations of a set of candidate future moments in the plurality of future moments based on the predicted sizes. The techniques further involve: determining, based on the sizes of the available storage space and the available durations of the set of candidate future moments, predicted values that characterize available storage capacities of the set of candidate future moments. The techniques further involve: determining a target moment from the set of candidate future moments based on the predicted values to recycle at least part of an available storage space of the target moment.

15 Claims, 5 Drawing Sheets

(56) References Cited

U.S. PATENT DOCUMENTS

| | | | | |
|---|---|---|---|---|
| 2011/0082972 | A1* | 4/2011 | Cherkasova | G06F 11/1461 |
| | | | | 711/111 |
| 2015/0006835 | A1* | 1/2015 | Oberhofer | G06F 11/1666 |
| | | | | 711/162 |
| 2018/0268304 | A1* | 9/2018 | Manadhata | G06N 20/20 |
| 2020/0401456 | A1* | 12/2020 | Sivak | G06F 9/5016 |
| 2021/0004682 | A1* | 1/2021 | Gong | G06N 3/08 |
| 2021/0334206 | A1* | 10/2021 | Colgrove | G06F 3/0638 |

\* cited by examiner

METHOD, ELECTRONIC DEVICE AND COMPUTER PROGRAM PRODUCT FOR MANAGING STORAGE SPACE

CROSS-REFERENCE TO RELATED APPLICATION

This application claims priority to Chinese Patent Application No. CN202010759557.9, on file at the China National Intellectual Property Administration (CNIPA), having a filing date of Jul. 31, 2020, and having "METHOD, ELECTRONIC DEVICE AND COMPUTER PROGRAM PRODUCT FOR MANAGING STORAGE SPACE" as a title, the contents and teachings of which are herein incorporated by reference in their entirety.

TECHNICAL FIELD

Embodiments of the present disclosure relate to the field of data storage, and more particularly, to a method, an electronic device, and a computer program product for managing a storage space.

BACKGROUND

Generally, users run various file systems on computing devices. These file systems may be used to process various data, while a large amount of storage space is allocated for these file systems to store these data.

Due to the improvement of the file systems, the data used by the file systems is constantly changing. Therefore, users now usually run these file systems on servers of storage systems, and use dedicated storage devices to store or manage these data. As more and more data needs to be processed, the capacity and number of storage apparatuses in the storage systems are also increasing rapidly. However, there are still many problems to be solved in the process of storing data using these storage apparatuses.

SUMMARY OF THE INVENTION

The embodiments of the present disclosure provide a method, a device, and a computer program product for managing a storage space.

According to a first aspect of the present disclosure, a method for managing a storage space is provided. The method includes: determining, based on sizes of a storage space used by a file system at a set of historical moments and a current moment, a plurality of predicted sizes of a storage space to be used by the file system at a plurality of future moments. The method further includes: determining sizes of an available storage space and available durations of a set of candidate future moments in the plurality of future moments based on the plurality of predicted sizes, the available storage space being a storage space that is not used in a storage space allocated to the file system. The method further includes: determining, based on the sizes of the available storage space and the available durations of the set of candidate future moments, a plurality of predicted values that characterize (or identify) available storage capacities of the set of candidate future moments. The method further includes: determining a target moment from the set of candidate future moments based on the plurality of predicted values, so as to recycle at least part of an available storage space of the target moment.

According to a second aspect of the present disclosure, an electronic device is provided. The electronic device includes: a processor; and a memory storing computer program instructions. The processor runs the computer program instructions in the memory to control the electronic device to execute actions including: determining, based on a size of a storage space that has been used by a file system at a set of historical moments and a current moment, a plurality of predicted sizes of a storage space to be used by the file system at a plurality of future moments; determining sizes of an available storage space and available durations of a set of candidate future moments in the plurality of future moments based on the plurality of predicted sizes, the available storage space being a storage space that is not used in a storage space allocated to the file system; determining, based on the sizes of the available storage space and the available durations of the set of candidate future moments, a plurality of predicted values that characterize available storage capacities of the set of candidate future moments; and determining a target moment from the set of candidate future moments based on the plurality of predicted values, so as to recycle at least part of an available storage space of the target moment.

According to a third aspect of the present disclosure, a computer program product is provided. The computer program product is tangibly stored on a non-volatile computer-readable medium and includes machine-executable instructions that, when executed, cause a machine to perform the steps of the method in the first aspect of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

In the drawings, identical or corresponding reference numerals indicate identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms should be understood as open-ended inclusion, i.e., "including but not limited to." The term "based on" should be understood as "based at least in part on." The term "one embodiment" or "this embodiment" should be understood as "at least one embodiment." The terms "first," "second," etc. may refer to different or identical objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation on the scope of the present disclosure.

When various file systems are running, storage spaces are allocated for various file systems in a storage system. For example, when a file system runs in a storage system, the storage system allocates a corresponding storage space for the file system to use.

During operations of the storage system, the storage space allocated to the file system may be much larger than a storage space required by the file system. In order not to waste the storage space, the storage space needs to be recycled for use in other file systems. Therefore, recycling the storage space allocated to the file system for use by other file systems is a problem that needs to be solved.

However, in a traditional solution, the used storage space of the file system is detected many times, and if the used storage space is relatively small each time, the recycling of the storage space starts. However, after the storage space is recycled, the storage space for the file system usually needs to be increased at a later moment. As a result, the recycled storage space needs to be allocated to the file system again, which wastes a large amount of processing resources used for recycling and allocating operations, and the recycled storage space is not actually used. In addition, the performance of the space recycling operation is not optimal. As the more space to recycle, the more time is required.

In order to solve the above and other potential problems, the present disclosure provides a method for managing a storage space. In the method, a computing device determines, based on sizes of a storage space used by a file system at a set of historical moments and a current moment, a plurality of predicted sizes of a storage space to be used by the file system at a plurality of future moments. Then, the computing device determines sizes of an available storage space and available durations of a set of candidate future moments in the plurality of future moments based on the plurality of predicted sizes. The computing device determines, using the sizes of the available storage space and the available durations of the set of candidate future moments, a plurality of predicted values that characterize available storage capacities of the set of candidate future moments. The computing device determines a target moment from the set of candidate future moments using the plurality of predicted values, so as to recycle at least part of an available storage space of the target moment. Through the above method, not only the storage space utilization is increased, but also the storage system performance and the space efficiency are improved and the user experience is improved.

Figure 1:
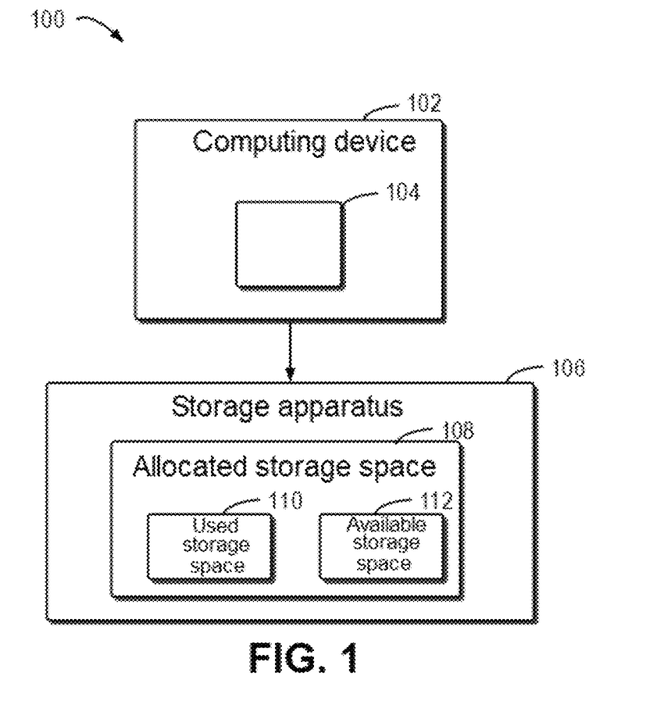
FIG. 1 illustrates a schematic diagram of example environment 100 where a device and/or a method according to an embodiment of the present disclosure may be implemented.

The embodiments according to the present disclosure are described in detail below through FIGS. 1 to 7. FIG. 1 illustrates a schematic diagram of example environment 100 where a device and/or a method according to the embodiments of the present disclosure may be implemented.

As shown in FIG. 1, computing device 102 runs file system 104. File system 104 may be any file system program that uses a storage space in storage apparatus 106, such as a file system. File system 104 may be accessed or managed by one or more users.

Computing device 102 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Computing device 102 calculates sizes of storage space 110 used by file system 104 at historical moments and a current moment. Then, computing device 102 may predict, according to the sizes of storage space 110 at the historical moments and the current moment, a plurality of predicted sizes of storage space 110 to be used by file system 104 at an immediate plurality of future moments.

Computing device 102 will determine a set of candidate future moments from the plurality of future moments. The set of candidate future moments are immediate after the current moment. Then, computing device 102 acquires a target moment for acquiring available storage space 112 from the set of candidate future moments. Available storage space 112 is a storage space not used in storage space 108 allocated to file system 104.

In some embodiments, in order to ensure that recycled available storage space 112 does not need to be re-allocated to file system 104 after a short period of time, a storage space starting to be recycled at each of a plurality of future moments needs to be remained recycled at least for a threshold duration. In this way, the waste of computing resources for recycling the storage space and reallocating the storage space can be avoided. Therefore, a duration from each moment in a set of candidate future moments to the last moment in the plurality of future moments has to be longer than the threshold duration.

Computing device 102 needs to determine a predicted value that is associated with each candidate moment among a set of candidate moments and characterizes an available storage capacity. The predicted value is determined by a size of an available storage space and an available duration at the candidate moment. In some embodiments, the predicted value is a product of the size of the available storage space and the available duration. The larger the product is, a better effect of recycling the storage space is indicated. In some embodiments, available storage space 112 is determined by a maximum used storage space determined at the candidate future moment and storage space 108 allocated at a current moment. In one example, available storage space 112 is determined by subtracting the storage space 108 allocated at the current moment by the maximum used storage space determined at the candidate moment. The above examples are only for describing the present disclosure, rather than specifically limiting the present disclosure.

Computing device 102 searches for a target predicted value that is greater than a threshold from calculated predicted values. In some embodiments, the threshold is set in advance, which considers the effect of recycled available storage space 112 and a storage duration and computing resources used for performing a recycling operation. In some embodiments, the threshold may be set to any suitable value. In some embodiments, the target predicted value is a maximum value in a set of predicted values corresponding to a set of candidate moments and obtained from calculation. The above examples are only for describing the present disclosure, rather than specifically limiting the present disclosure.

If computing device 102 can identify the target predicted value from the calculated predicted values, it is determined that a duration from the current moment to the target moment corresponding to the target predicted value is determined as a target duration for recycling the storage space. Then, it is determined, according to the target duration, whether to perform the operation of recycling an available storage space.

Computing device 102 needs to make a new prediction and reselect a target moment every time a predetermined duration has passed. If the calculated target duration for recycling available storage space 112 is less than the predetermined duration, the storage space recycling operation may be performed at the target moment. If the calculated target duration is longer than the predetermined duration, the recycling of available storage space 112 will not be performed during the process of predicting and determining the target moment.

Storage apparatus 106 has storage space 108 allocated for file system 104. Storage space 108 includes storage space 110 used by file system 104 and available storage space 112 that is allocated to file system 104 but not used and can be recycled.

As shown in FIG. 1, FIG. 1 shows that file system 104 is running in computing device 102, and storage apparatus 106 has allocated storage space 108 corresponding to file system 104. That file system 104 is running in computing device 102 and storage apparatus 106 includes allocated storage space 108 for file system 104 is only for the convenience of describing the present disclosure, rather than specifically limiting the present disclosure. In other embodiments, any number of file systems may run in computing device 102, and storage apparatus 106 has a plurality of allocated storage spaces corresponding to the plurality of file systems.

Through the above method, not only the storage space utilization is increased, but also the storage system performance and the space efficiency are improved and the user experience is improved.

A schematic diagram of environment 100 in which a device and/or a method according to an embodiment of the present disclosure may be implemented is described above with reference to FIG. 1. A flowchart of method 200 for managing a storage space according to an embodiment of the present disclosure is described below with reference to FIG. 2. Method 200 may be implemented in computing device 102 in FIG. 1 or any other suitable devices.

Figure 2:
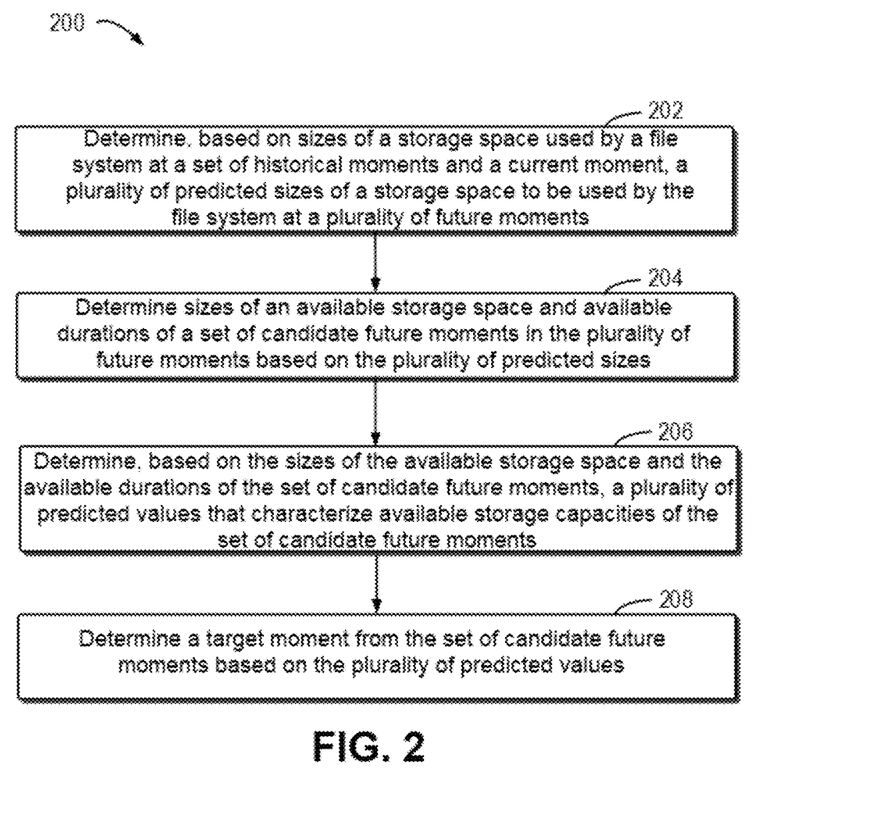
FIG. 2 shows a flowchart of method 200 for managing a storage space according to an embodiment of the present disclosure.

At block 202, computing device 102 determines, based on sizes of a storage space used by file system 104 at a set of historical moments and a current moment, a plurality of predicted sizes of a storage space to be used by file system 104 at a plurality of future moments. Since the storage space used by file system 104 is usually related to a storage space used in history, computing device 102 may predict a storage space to be used in the future based on the used storage space.

In some embodiments, computing device 102 acquires sizes of a storage space used at a set of historical moments and a current moment. Then, computing device 102 determines a plurality of predicted sizes based on sizes of the storage space that have been used and a storage space prediction model. The storage space prediction model is trained by inputting a first reference size of a storage space used by file system 104 at a first reference moment and outputting a second reference size of a storage space used at a second reference moment following the first reference moment. The process of training the storage space prediction model will be described below with reference to FIG. 5. In this way, the size of a storage space to be used at a future moment can be quickly predicted, which improves the efficiency and accuracy of prediction.

In some embodiments, the sizes of the storage space that have been used as input are determined, and then predetermined processing is performed on the sizes of the storage space that have been used. Then, the processed sizes of the storage space that have been used are input into the storage space prediction model for training. In one example, during the predetermined processing, subtraction operation is performed on the sizes of the storage space used at adjacent moments. Alternatively or additionally, data resulted from the subtraction operation is normalized. In this way, the amount of data processing can be reduced and the efficiency of data processing can be improved. The above examples are only for describing the present disclosure, rather than specifically limiting the present disclosure.

At block 204, computing device 102 determines sizes of an available storage space and available durations of a set of candidate future moments in the plurality of future moments based on the plurality of predicted sizes. The available storage space is a storage space that is not used in a storage space allocated to file system 104. The process of determining sizes of an available storage space and available durations using the plurality of predicted sizes will be described below with reference to FIG. 3.

At block 206, computing device 102 determines, based on the sizes of the available storage space and the available durations of the set of candidate future moments, a plurality of predicted values that characterize available storage capacities of the set of candidate future moments.

In some embodiments, the predicted value is determined by a product of the size of the available storage space and the available duration. In some embodiments, other suitable operations may be performed on the size of the available storage space and the available duration to determine the predicted value. For example, a predetermined mathematical transformation may be performed on the size of the available storage space and/or the available duration, for example, their square roots are calculated, and then the predicted value is determined based on a transformed value. The above examples are only for describing the present disclosure, rather than specifically limiting the present disclosure. Those skilled in the art can set any suitable mode to determine the predicted value based on the size of the available storage space and the available duration.

At block 208, computing device 102 determines a target moment from the set of candidate future moments based on the plurality of predicted values, so as to recycle at least part of an available storage space of the target moment. Computing device 102 needs to find a target moment at which the recycling operation may be performed from a set of candidate future moments.

In some embodiments, computing device 102 first determines at least one candidate predicted value that is greater than a first threshold from a plurality of predicted values. The first threshold is preset. Then, computing device 102 determines a target predicted value from the at least one candidate predicted value. In some embodiments, when the at least one candidate predicted value includes a plurality of candidate predicted values, computing device 102 determines the maximum candidate predicted value among the plurality of candidate predicted values as the target predicted value. In this way, a suitable target predicted value can be quickly found from a plurality of candidate predicted values.

Then, computing device 102 determines a target moment based on the target predicted value. The target moment is found from a plurality of future moments based on the target predicted value. In this way, a moment at which an available storage space is recycled can be quickly and accurately determined, thereby improving the efficiency of recycling and saving time.

In some embodiments, computing device 102 determines a target duration from the current moment to the determined target moment. Then, computing device 102 determines whether the target duration is shorter than a second threshold duration. The second threshold duration is a preset duration for re-predicting and determining the target moment.

If it is determined that the target duration is shorter than or equal to the second threshold duration, the at least part of the available storage space of the target moment is recycled at the target moment. In this way, an available storage space can be recycled quickly and accurately. If the target duration is longer than the second threshold duration, the recycling operation of the storage space will not be performed or obtained.

Through the above method, not only the storage space utilization is increased, but also the storage system performance and the space efficiency are improved and the user experience is improved.

Figure 3:
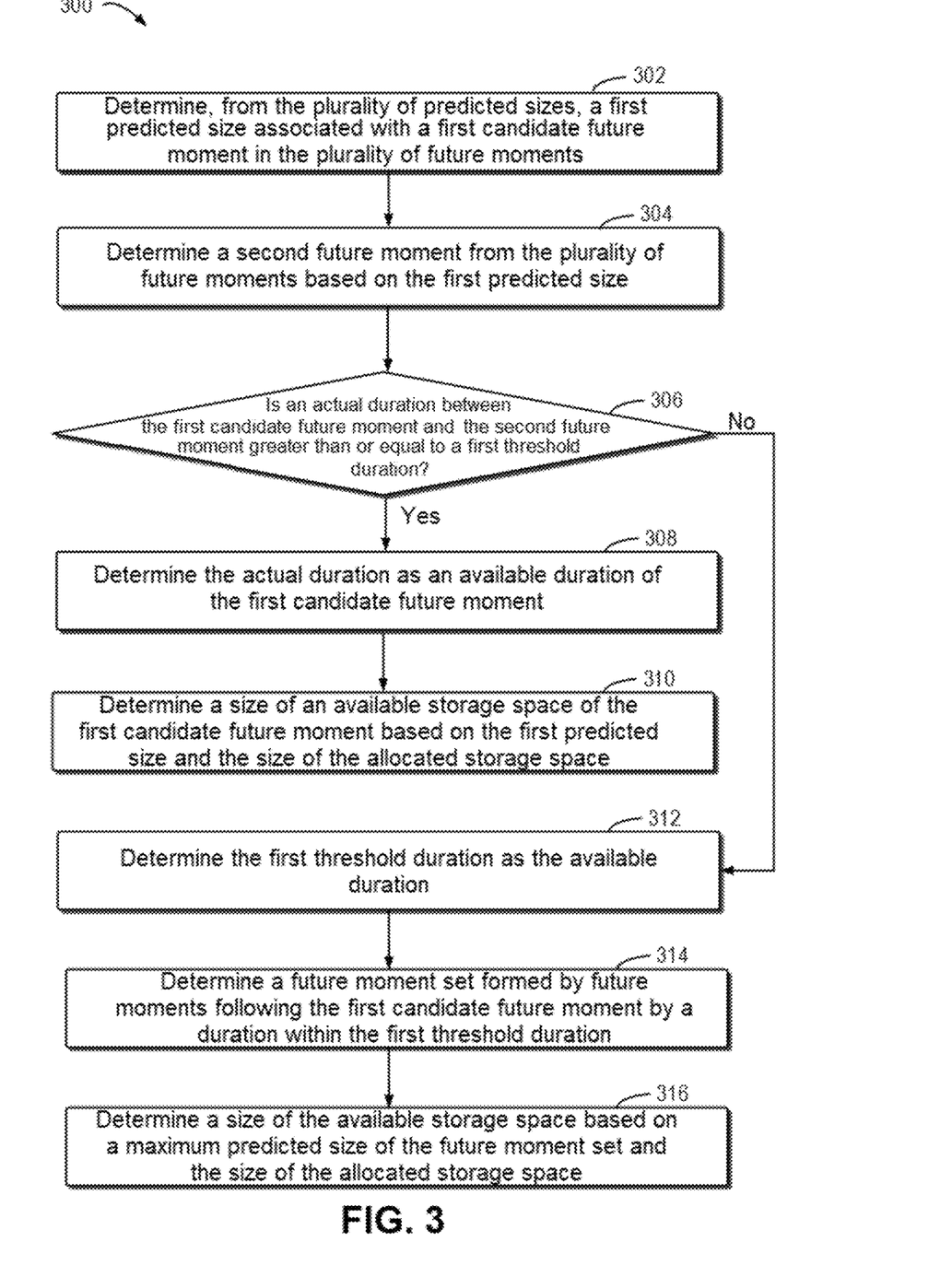
FIG. 3 shows a flowchart of method 300 for determining a size of a storage space and an available duration according to an embodiment of the present disclosure.

Method 200 for managing a storage space according to an embodiment of the present disclosure has been described above with reference to FIG. 2. The method for determining a size of an available storage space and an available duration will be described below with reference to FIG. 3. FIG. 3 shows a flowchart for determining a size of a storage space and an available duration according to an embodiment of the present disclosure. Method 300 in FIG. 3 may be implemented by computing device 102 in FIG. 1 or any other suitable devices.

At block 302, computing device 102 determines, from the plurality of predicted sizes, a first predicted size associated with a first candidate future moment in the plurality of future moments. Computing device 102 determines a size of an available storage space and an available duration of each candidate future moment in a set of candidate future moments.

At block 304, computing device 102 determines a second future moment from the plurality of future moments based on the first predicted size. A predicted size of each moment between the first candidate moment and the second future moment is less than or equal to the first predicted size. Therefore, the predicted size of the future moment between the first candidate future moment and the second future moment selected by computing device 102 from the plurality of future moments is less than the first predicted size.

At block 306, computing device 102 determines whether an actual duration between the first candidate future moment and the second future moment is longer than or equal to a first threshold duration. The first threshold duration is preset, which is to ensure that the recycled available storage space may be executed for at least a threshold duration.

If it is determined that the actual duration between the first candidate future moment and the second future moment is longer than or equal to the first threshold duration, at block 308, computing device 102 determines the actual duration as an available duration of the first candidate future moment.

At block 310, computing device 102 determines a size of an available storage space of the first candidate future moment based on the first predicted size and the size of the allocated storage space. In one example, the size of an allocated storage space is the size of a storage space allocated at a current moment. The above examples are only for describing the present disclosure, rather than specifically limiting the present disclosure.

If it is determined that the actual duration is less than the first threshold duration, at block 312, computing device 102 determines the first threshold duration as the available duration. Because the actual duration is relatively short, it indicates that the recycled available storage space cannot be executed for the threshold duration. In this way, the storage space will be allocated to the file system within a short time after being recycled, thereby wasting the recycled storage space and computing resources used for allocating the storage space. Therefore, computing device 102 determines the first threshold duration as the available duration.

At block 314, computing device 102 determines a future moment set formed by future moments following the first candidate future moment by a duration within the first threshold duration. Computing device 102 determines the future moment set according to the first threshold duration.

At block 316, computing device 102 determines a size of the available storage space based on a maximum predicted size of the future moment set and the size of the allocated storage space. Computing device 102 finds a maximum predicted size from the storage space size associated with the future moment set, and then subtracts the maximum predicted size from the size of the allocated storage space to obtain the size of the available storage space.

Through the method, the computing device may quickly determine the size and moment of an available storage space at a candidate future moment, so that the effect of recycling the available storage space can be determined more accurately, and the use efficiency of the available storage space can be improved.

The flowchart of a method for determining sizes of an available storage space and available durations has been described above with reference to FIG. 3. Correspondence graph 400 between a moment and a storage space will be described below with reference to FIG. 4.

Figure 4:
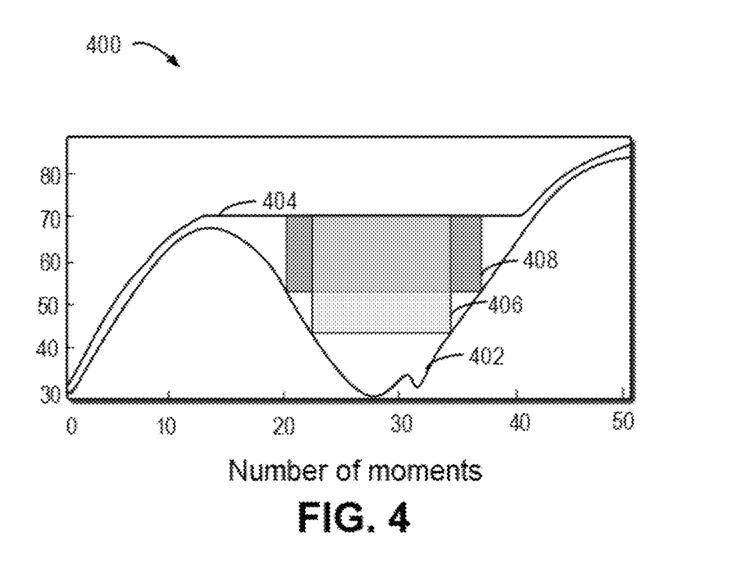
FIG. 4 illustrates correspondence graph 400 between a moment and a storage space according to an embodiment of the present disclosure.

As shown in FIG. 4, a horizontal axis in correspondence graph 200 between a moment and a storage space represents the number of moments, and a time period between two moments corresponding to the number of adjacent moments has a predetermined duration. A vertical axis of graph 200 is a storage space of file system 104, and the unit is, for example, GB. For the convenience of description, the following description does not use the unit of the storage space, but only uses the size value of the storage space.

Curve 402 represents a storage space to be used by file system 104 at different moments, and curve 404 represents a storage space allocated to file system 104 by computing device 102 at different moments. The storage space prediction model may predict predicted sizes of storage spaces to be used at 20 moments, and the threshold duration is set to 10 times the predetermined duration. Therefore, the number of moments corresponding to the threshold duration is 10.

As shown in FIG. 4, at the 19th moment, the value of the used space is 53 and the value of the allocated space is 70. Then 20 moments following the 19th moment are predicted: a predicted storage space size at the 20th moment to the 39th moment is $S_{predicted}$=[50, 47, 43, 40, 37, 34, 32, 31, 30, 30, 35, 32, 34, 37, 40, 44, 50, 54, 59, 65]. The sizes of allocated storage space at predicted moments are all 70 for the storage space as at the 19th moment.

If the storage space starts to be recycled at the 20th moment, the size of the storage space used at the 20th moment is 50. The size of the storage space used after the 20th moment is always less than or equal to the size of the used storage space (for example, 50) at the 20th moment, until the last end moment of the 36th moment. The maximum value of the size of the used storage space from the 20th moment to the 36th moment is 50, so the size of a recyclable storage space is 20. A predicted value for the 20th moment $W_1$=16×20×predetermined duration=320×predetermined duration, which corresponds to the area of region 408.

If the storage space starts to be recycled at the 23rd moment, the size of the storage space used at the 23rd moment is 40. After the 23rd moment, the moment until which the size of the storage space used is always less than or equal to the size of the used storage space (for example, 40) at the 23rd moment is the 34th moment. The size of the storage space at the 34th moment is 40. At this moment, the size of the recyclable storage space is 30. Then, a predicted value for the 23rd moment $W_4$=11×30×predetermined duration=330×predetermined duration, which corresponds to the area of region 406.

If the storage space starts to be recycled at the 26th moment, the size of the storage space used at the 26th moment is 32. Since the threshold duration is 10 time intervals, an end point is not the 30th moment, but the 36th moment. The maximum predicted storage space size is selected from these moments, for example, the predicted storage space size at the 36th moment is 50. Then a predicted value for the 26th moment $W_7$=10×20×predetermined duration=200×predetermined duration. The threshold duration is set to ensure that the recycled storage space can be recycled for a sufficient period of time, to prevent a newly recycled storage space from being allocated again, and to avoid wasting computing resources for recycling the storage space and allocating the storage space. Due to the limitation of the threshold duration, only the predicted value up to the 29th moment is calculated out of 20 predicted moments.

According to the size of a predicted value Wi, the storage space recycling may start from the 23rd moment. Through the above mode, a suitable moment may be selected for the storage space recycling. The size and utilization of available storage resources are improved.

The schematic diagram of correspondence graph 400 between a moment and a storage space has been described above with reference to FIG. 4. A schematic diagram of process 500 for training a storage space prediction model will be described below with reference to FIG. 5.

Figure 5:
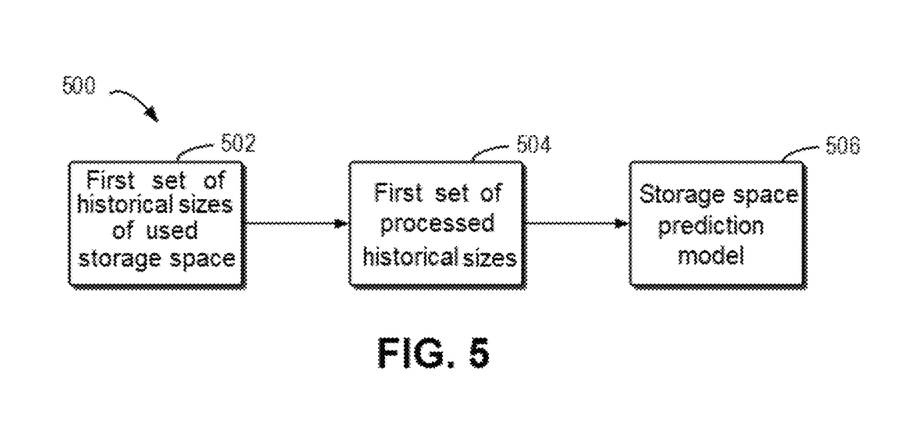
FIG. 5 illustrates a schematic diagram of process 500 for training a storage space prediction model according to an embodiment of the present disclosure.

The storage space prediction model used in the above process of predicting a storage space is pre-trained. In the process of training the storage space prediction model, first set of historical sizes of a storage space used 502 by a file system in the past and a second set of historical sizes that have been used at a moment to be predicted are first acquired. For example, the first set of historical sizes at N historical moments is S=[$S_1$, $S_2$, $S_3$, . . . , $S_N$], where N is a positive integer greater than 1.

The first set of historical sizes is then pre-processed to obtain first set of processed historical sizes 504. In some embodiments, subtraction operation is performed on historical storage space sizes at moments before and after the first set of historical sizes, and then data obtained from the subtraction is normalized to obtain first set of processed historical sizes 504. For example, the first set of historical sizes S is converted into a set of data D−S=[$S_2$−$S_1$, $S_3$−$S_2$, . . . , $S_N$−$S_{N-1}$], and then the set of converted data D−S is normalized, so that the size of each data item in the set of normalized data is between −1 and 1.

Then, storage space prediction model 506 is trained by inputting the first set of processed historical sizes and outputting the second set of historical sizes. In one example, the storage space prediction model is a long-short term memory (LSTM) model. In other examples, the storage space prediction model may be any other suitable machine learning model, including various neural network models. The above examples are only for describing the present disclosure, rather than specifically limiting the present disclosure.

Through the above method, the storage space prediction model can be quickly trained, the training time of the model is shortened, and the amount of computation in the training process is reduced.

The schematic diagram of process 500 for training a storage space prediction model has been described above with reference to FIG. 5. A schematic diagram of process 600 for adjusting a storage space prediction model in a plurality of prediction periods will be described below with reference to FIG. 6.

Figure 6:
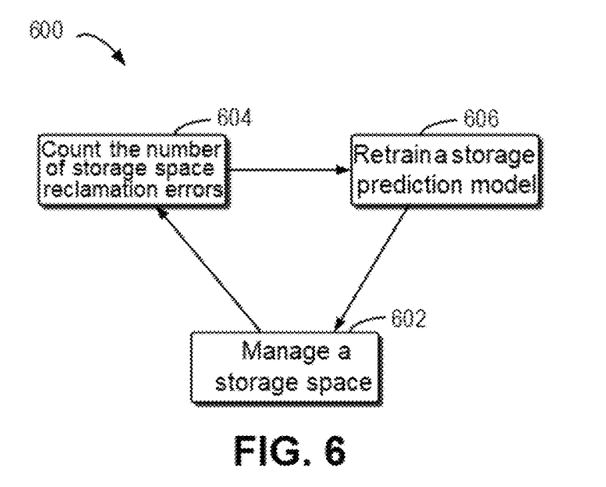
FIG. 6 illustrates a schematic diagram of process 600 for adjusting a storage space prediction model in a plurality of prediction periods according to an embodiment of the present disclosure.

The trained storage space prediction model is used to manage storage space 602. In the process of managing storage space 602, the number of storage space recycling errors is counted 604. If the storage space is allocated to the file system within a threshold time after being recycled, it is determined as one storage space recycling error. If it is found that the number of errors in the storage space recycling operation for a predetermined frequency (for example, 10) exceeds a threshold frequency, for example, 2, the storage space prediction model needs to be retrained 606. Then the retrained storage space prediction model is used to manage a storage space 602. In some embodiments, the number of storage space recycling errors may be set to 0 after a predetermined number of predictions. For example, the number of errors may be set to 0 after 10 prediction operations are performed to manage the storage space.

In this way, the storage space prediction model can be more accurate, the prediction effect can be improved, and the storage space utilization can be improved.

Figure 7:
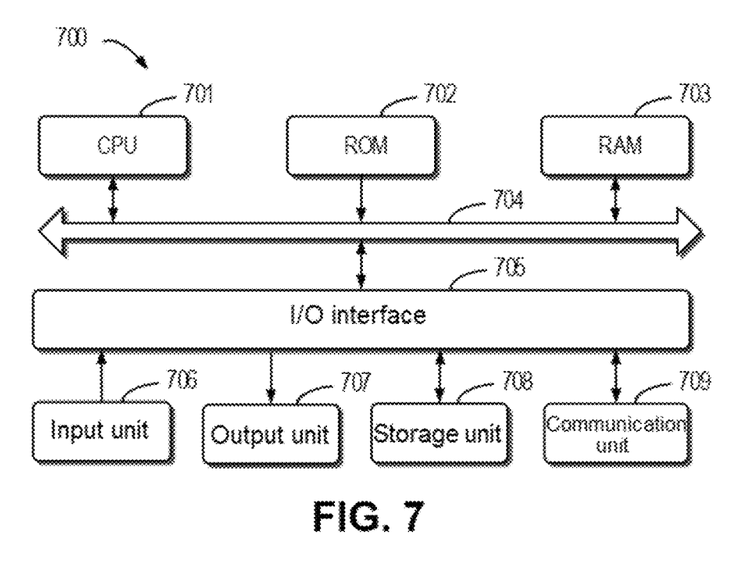
FIG. 7 is a schematic block diagram of example device 700 suitable for implementing an embodiment of content of the present disclosure.

FIG. 7 illustrates a schematic block diagram of example device 700 that may be configured to implement an embodiment of content of the present disclosure. For example, computing device 102 as shown in FIG. 1 may be implemented by device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, for example, methods 200 and 300, are performed by processing unit 701. For example, in some embodiments, methods 200 and 300 may be implemented as a computer software program that is tangibly included in a machine-readable medium such as storage unit 708. In some embodiments, some or all of the computer program may be loaded and/or installed onto device 700 through ROM 702 and/or communication unit 709. When the computer program is loaded into RAM 703 and executed by CPU 701, one or more steps of methods 200 and 300 described above may be implemented.

The embodiments of the present disclosure relate to a method, an electronic device, and/or a computer program product. The embodiments of the present disclosure may further include a computer-readable storage medium having computer-readable program instructions for performing various aspects of the present disclosure.

The computer-readable storage medium may be a tangible device that may hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagating freely, electromagnetic waves propagating through waveguides or other transmission media (e.g., light pulses propagating through fiber-optic cables), or electrical signals transmitted over electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In case of a remote computer being involved, the remote computer may be connected to a user computer through any type of network, including an LAN or a WAN, or may be connected to an external computer, e.g., connected through the Internet using an Internet service provider. In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus/system, and the computer program product according to embodiments of the present disclosure. It should be appreciated that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. A method for managing a storage space, comprising:
    determining, based on sizes of a storage space used by a file system at a set of historical moments and a current moment, a plurality of predicted sizes of a storage space to be used by the file system at a plurality of future moments, at least in part by:
        acquiring sizes of the storage space used at the set of historical moments and the current moment, and
        determining the plurality of predicted sizes based on the sizes of the storage space that have been used and a storage space prediction model, the storage space prediction model being trained by inputting a first reference size of a storage space used by the file system at a first reference moment and outputting a second reference size of a storage space used at a second reference moment following the first reference moment;
    determining sizes of an available storage space and available durations of a set of candidate future moments in the plurality of future moments based on the plurality of predicted sizes, the available storage space being a storage space that is not used in a storage space allocated to the file system;
    determining, based on the sizes of the available storage space and the available durations of the set of candidate future moments, a plurality of predicted values that characterize available storage capacities of the set of candidate future moments;
    determining a target moment from the set of candidate future moments based on the plurality of predicted values;
    determining a target duration from the current moment to the target moment;
    recycling, at the target moment, at least part of the available storage space for use by other file systems also running in a storage system that runs the file system, wherein the recycling is performed only in response to a determination that the target duration is less than a second threshold duration, and whereby storage space utilization in the storage system is increased, wherein the second threshold duration is a preset duration for re-determining the target moment;
    incrementing a storage space recycling error count each time a portion of storage space is allocated within a threshold time period after having previously been recycled; and
    retraining the prediction model responsive to the storage space recycling error count exceeding a threshold number of recycling errors.

2. The method according to claim 1, wherein determining the sizes of the available storage space and the available durations comprises:
    determining, from the plurality of predicted sizes, a first predicted size associated with a first candidate future moment in the plurality of future moments;
    determining a second future moment from the plurality of future moments based on the first predicted size, a predicted size of each moment between the first candidate future moment and the second future moment being less than or equal to the first predicted size;
    determining, if it is determined that an actual duration between the first candidate future moment and the second future moment is longer than or equal to a first threshold duration, the actual duration as an available duration of the first candidate future moment; and
    determining a size of an available storage space of the first candidate future moment based on the first predicted size and the size of the allocated storage space.

3. The method according to claim 2, wherein determining the sizes of the available storage space and the available durations further comprises:
    determining, if it is determined that the actual duration is less than the first threshold duration, the first threshold duration as the available duration;
    determining a future moment set formed by future moments following the first candidate future moment by a duration within the first threshold duration; and
    determining a size of the available storage space based on a maximum predicted size of the future moment set and the size of the allocated storage space.

4. The method according to claim 1, wherein determining the target moment comprises:
   determining at least one candidate predicted value greater than a first threshold from the plurality of predicted values;
   determining a target predicted value from the at least one candidate predicted value; and
   determining the target moment based on the target predicted value.

5. The method according to claim 4, wherein the at least one candidate predicted value comprises a plurality of candidate predicted values, and wherein determining the target predicted value from the at least one candidate predicted value comprises:
   determining the maximum candidate predicted value among the plurality of candidate predicted values as the target predicted value.

6. An electronic device, comprising:
   at least one processor; and
   a memory coupled to the at least one processor and having instructions stored thereon, the instructions causing, when executed by the at least one processor, the device to perform actions comprising:
   determining, based on sizes of a storage space used by a file system at a set of historical moments and a current moment, a plurality of predicted sizes of a storage space to be used by the file system at a plurality of future moments, at least in part by:
      acquiring sizes of the storage space used at the set of historical moments and the current moment, and
      determining the plurality of predicted sizes based on the sizes of the storage space that have been used and a storage space prediction model, the storage space prediction model being trained by inputting a first reference size of a storage space used by the file system at a first reference moment and outputting a second reference size of a storage space used at a second reference moment following the first reference moment;
   determining sizes of an available storage space and available durations of a set of candidate future moments in the plurality of future moments based on the plurality of predicted sizes, the available storage space being a storage space that is not used in a storage space allocated to the file system;
   determining, based on the sizes of the available storage space and the available durations of the set of candidate future moments, a plurality of predicted values that characterize available storage capacities of the set of candidate future moments;
   determining a target moment from the set of candidate future moments based on the plurality of predicted values;
   determining a target duration from the current moment to the target moment;
   recycling, at the target moment, at least part of the available storage space for use by other file systems also running in a storage system that runs the file system, wherein the recycling is performed only in response to a determination that the target duration is less than a second threshold duration, and whereby storage space utilization in the storage system is increased, wherein the second threshold duration is a preset duration for re-determining the target moment;
   incrementing a storage space recycling error count each time a portion of storage space is allocated within a threshold time period after having previously been recycled; and
   retraining the prediction model responsive to the storage space recycling error count exceeding a threshold number of recycling errors.

7. The electronic device according to claim 6, wherein determining the sizes of the available storage space and the available durations comprises:
   determining, from the plurality of predicted sizes, a first predicted size associated with a first candidate future moment in the plurality of future moments;
   determining a second future moment from the plurality of future moments based on the first predicted size, a predicted size of each moment between the first candidate moment and the second future moment being less than or equal to the first predicted size;
   determining, if it is determined that an actual duration between the first candidate future moment and the second future moment is greater than or equal to a first threshold duration, the actual duration as an available duration of the first candidate future moment; and
   determining a size of an available storage space of the first candidate future moment based on the first predicted size and the size of the allocated storage space.

8. The electronic device according to claim 7, wherein determining the sizes of the available storage space and the available durations further comprises:
   determining, if it is determined that the actual duration is less than the first threshold duration, the first threshold duration as the available duration;
   determining a future moment set formed by future moments following the first candidate future moment by a duration within the first threshold duration; and
   determining a size of the available storage space based on a maximum predicted size of the future moment set and the size of the allocated storage space.

9. The electronic device according to claim 6, wherein determining the target moment comprises:
   determining at least one candidate predicted value greater than a first threshold from the plurality of predicted values;
   determining a target predicted value from the at least one candidate predicted value; and
   determining the target moment based on the target predicted value.

10. The electronic device according to claim 9, wherein the at least one candidate predicted value comprises a plurality of candidate predicted values, and wherein determining the target predicted value from the at least one candidate predicted value comprises:
    determining the maximum candidate predicted value among the plurality of candidate predicted values as the target predicted value.

11. A computer program product having a non-transitory computer readable medium which stores a set of instructions to manage a storage space; the set of instructions, when carried out by computerized circuitry, causing the computerized circuitry to perform a method of:
    determining, based on sizes of a storage space used by a file system at a set of historical moments and a current moment, a plurality of predicted sizes of a storage space to be used by the file system at a plurality of future moments, at least in part by:
       acquiring sizes of the storage space used at the set of historical moments and the current moment, and determining the plurality of predicted sizes based on the sizes of the storage space that have been used and a storage space prediction model, the storage space prediction model being trained by inputting a first reference size of a storage space used by the file system at a first reference moment and outputting a second reference size of a storage space used at a second reference moment following the first reference moment;

determining sizes of an available storage space and available durations of a set of candidate future moments in the plurality of future moments based on the plurality of predicted sizes, the available storage space being a storage space that is not used in a storage space allocated to the file system;

determining, based on the sizes of the available storage space and the available durations of the set of candidate future moments, a plurality of predicted values that characterize available storage capacities of the set of candidate future moments;

determining a target moment from the set of candidate future moments based on the plurality of predicted values;

determining a target duration from the current moment to the target moment;

recycling, at the target moment, at least part of the available storage space for use by other file systems also running in a storage system that runs the file system, wherein the recycling is performed only in response to a determination that the target duration is less than a second threshold duration, and whereby storage space utilization in the storage system is increased, wherein the second threshold duration is a preset duration for re-determining the target moment;

incrementing a storage space recycling error count each time a portion of storage space is allocated within a threshold time period after having previously been recycled; and retraining the prediction model responsive to the storage space recycling error count exceeding a threshold number of recycling errors.

12. The method according to claim 1, wherein the recycling increases a size of available storage resources in the storage system.

13. The method according to claim 1, wherein the storage space prediction model comprises a long-short term memory (LSTM) model.

14. The method according to claim 1, wherein the storage space prediction model comprises a neural network model.

15. The method according to claim 1, wherein recycling at least part of the available storage space for use by another file system at the target moment only in response to a determination that the target duration is less than the second threshold duration causes the available storage space to be recycled only in the event that the target moment occurs within the second threshold duration after the current moment.

* * * * *